United States Patent [19]

Comley

[11] 3,967,596
[45] July 6, 1976

[54] ENGINE CONTROL SYSTEMS

[75] Inventor: Peter Nigel Comley, Torquay, England

[73] Assignee: The Lucas Electrical Company Limited, Birmingham, England

[22] Filed: Apr. 9, 1974

[21] Appl. No.: 459,398

[30] Foreign Application Priority Data
Nov. 28, 1973 United Kingdom............... 55116/73
Apr. 12, 1973 United Kingdom............... 17610/73

[52] U.S. Cl. .......................... 123/32 EA; 73/194 A; 123/139 AW
[51] Int. Cl.² ......................................... F02B 3/00
[58] Field of Search................... 116/38; 73/194 A; 123/139 AW, DIG. 10, 32 EA

[56] References Cited
UNITED STATES PATENTS 3,766,897  10/1973  Husted ....................... 123/139 AW
3,771,505  11/1973  Taplin ........................ 123/139 AW
3,785,353  1/1974   Borisov....................... 123/32 EA
3,818,877  6/1974   Barrera........................ 73/194 A
3,842,811  10/1974  Shinoda...................... 123/139 AW
3,844,263  10/1974  Endo.......................... 123/139 AW Primary Examiner—Charles J. Myhre
Assistant Examiner—Daniel J. O'Connor
Attorney, Agent, or Firm—Holman & Stern

[57] ABSTRACT

An engine control system utilizes a vortex whistle for producing an acoustic signal the frequency of which varies with the rate of flow of air passing through the inlet manifold of the engine, and a control device for controlling an engine characteristic, such as the rate at which fuel is injected into the manifold, in accordance with the frequency of this acoustic signal.

3 Claims, 7 Drawing Figures

ENGINE CONTROL SYSTEMS

This invention relates to an engine control system for use with an internal combustion engine, and has as its object the provision of such a system in a convenient form.

The invention resides in an engine control system for use with an internal combustion engine, comprising a vortex whistle for producing an acoustic signal the frequency of which varies in accordance with the rate of flow of air passing through an induction manifold of the engine, and a control device for controlling an engine characteristic in accordance with the frequency of said acoustic signal.

Preferably, said control device controls the delivery of fuel to the engine in accordance with the frequency of said acoustic signal. Alternatively, said control device controls engine ignition.

Figure 1:
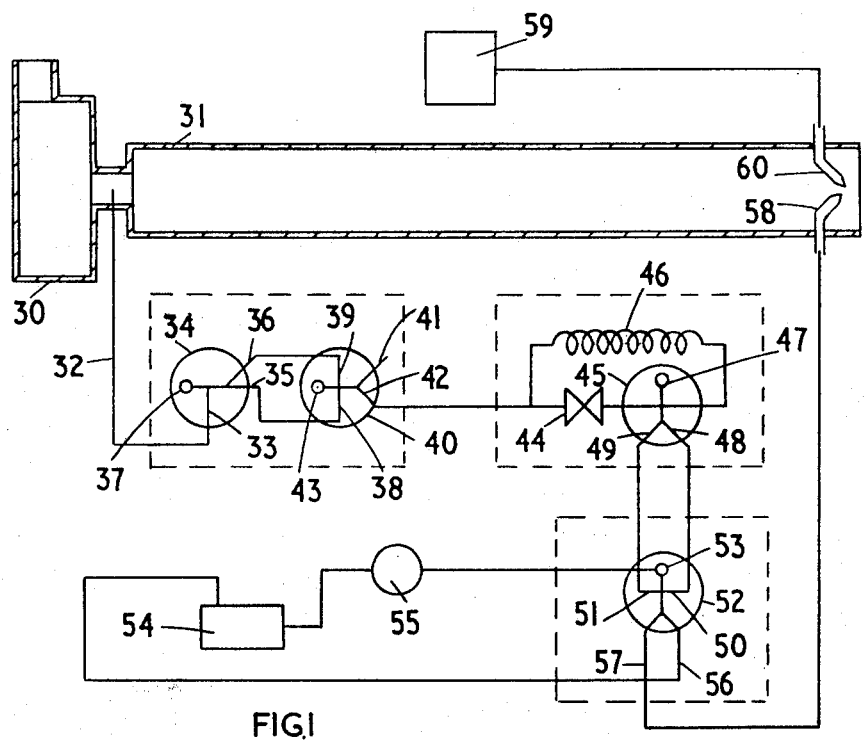
Figures 2, 3:
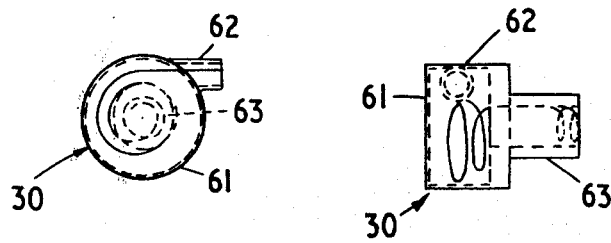
Figure 4:
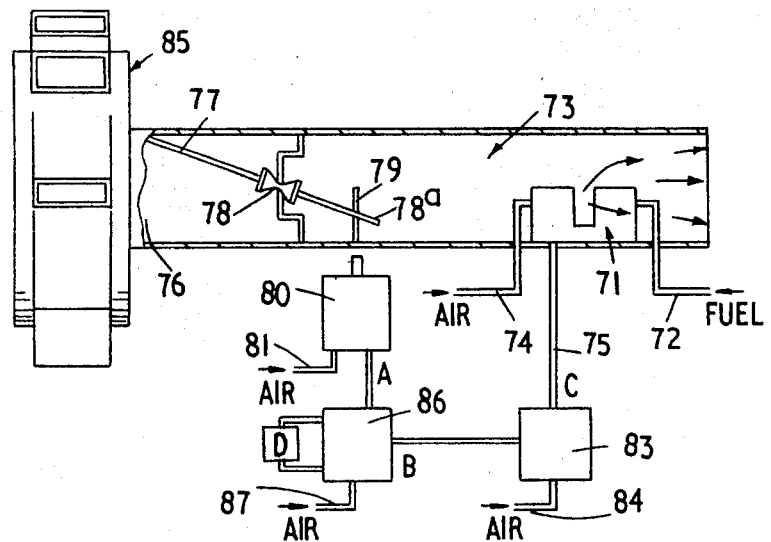
Figure 5:
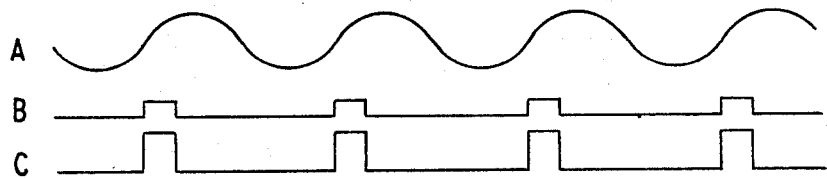
Figure 6:
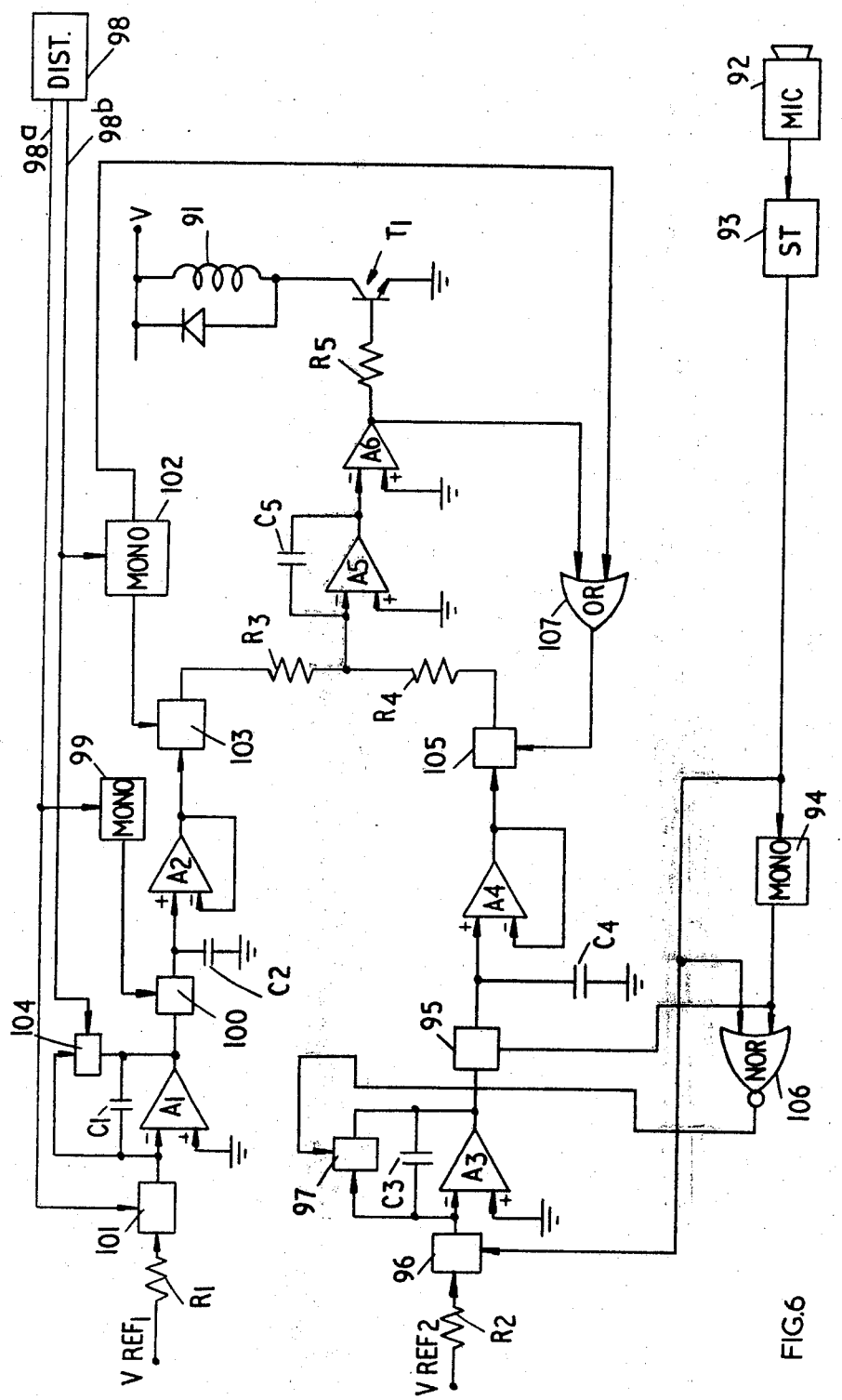
Figure 7:
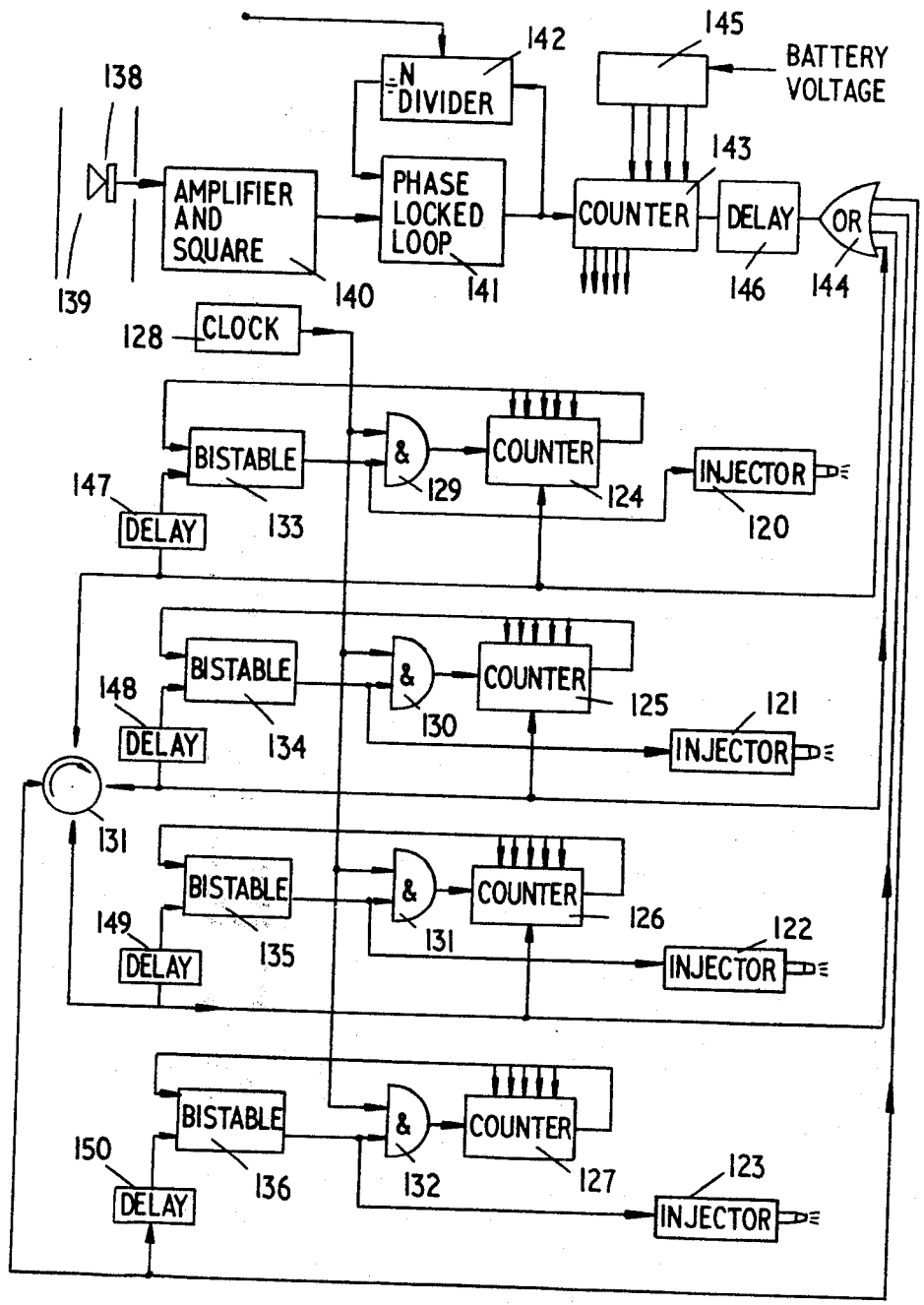

In the accompanying drawings:

FIG. 1 is a schematic representation of one embodiment of an engine control system constructed in accordance with the present invention, FIG. 2 is a plan view of one embodiment of the vortex whistle shown in FIG. 1, FIG. 3 is a side view of the vortex whistle shown in FIG. 1, FIG. 4 is a schematic representation of another embodiment of the invention, FIG. 5 shows a set of waveforms obtainable at various points in the system of FIG. 4, FIG. 6 is a diagrammatic view of yet another embodiment of the invention, and FIG. 7 is a diagrammatic representation of a still further embodiment of the invention.

Referring now more particularly to FIG. 1, the engine control system shown therein is intended for use in controlling the delivery of fuel to an internal combustion engine, and comprises a vortex whistle 30 through which passes air induced into the induction manifold 31 of the engine. An alternative is for a smaller vortex whistle to have a representative sample of the manifold air passed through it, which would then be returned to the manifold. The vortex whistle 30 produces in a passage 32 an acoustic signal, the frequency of which is proportional to the rate of flow of air passing through the induction manifold 31. The passage 32 is connected to a control port 33 of a monostable, fluidic element 34 which has a pair of outlet passages 35 and 36 and an inlet port 37 into which pressurised air or engine exhaust gas is supplied. The outlet passages 35 and 36 are connected respectively to two input ports 38 and 39 of a bistable fluidic element 40 which has a first outlet passage 41 venting to atmosphere and a second outlet passage 42. The bistable device 40 also has an inlet port 43 to which pressurised air or engine exhaust gas is supplied. The fluidic elements 34 and 40 together form a pulse shaper. The outlet passage 42 is connected through a restrictor 44 to one control port of a further bistable fluidic element 45, and through a fixed delay element 46 to the other control port of the bistable element 45. The latter also has an inlet port 47 to which pressurised air or engine exhaust gas is supplied, and a pair of outlet passages 48 and 49. The outlet passages 48 and 49 are connected respectively to two control ports 50 and 51 of yet a further bistable fluidic element 52. The latter has an inlet port 53 to which fuel is supplied from a tank 54 by way of a fuel pump 55, and a pair of outlet passages 56 and 57. The outlet passage 56 is connected to the fuel tank 54 and the outlet passage 57 is connected to a nozzle 58 mounted in the induction manifold 31 of the engine. An atomiser is provided and this includes a constant pressure air pump 59 and a nozzle 60 which is arranged to direct air from the pump 59 in a direction normal to fuel issuing from the nozzle 58. The nozzles 58 and 60 are arranged so as to direct fuel and air respectively at 45° to the direction of flow of air passing through the induction manifold. Instead of using the air pump 59 exhaust gases from the internal combustion engine could be fed to the nozzle 60.

The bistable element 45 together with the delay element 46 and the restrictor 44 together form a pulse width fixation module and the bistable element 52 forms a fluidic amplifier.

In use, when an acoustic pulse passes along the passage 32 to the control port 33 air is fed through the outlet passage 36 of the monostable element 34 to the control port 39 of the fluidic element 40. This in turn causes air from the input port 43 to pass through the outlet passage 42 and to the two control ports of the bistable element 45 through the restrictor 44 and the delay element 46 respectively. Thus during the delay period presented by the delay element 46 air supplied to the inlet port 47 of the element 45 will pass through the outlet passage 48 and to the control ports 50 of the bistable element 52. This will cause fuel supplied to the inlet port 53 of the bistable element 52 to be fed to the nozzle 58. However, after the delay determined by the delay element 46, the bistable element 45 will direct air to the control ports 51 of the bistable element 52 and therefore the fuel supplied to the inlet port 53 will be returned to the fuel tank 54 through the outlet passage 56. Moreover, when a fluidic pulse is absent at the inlet port 33 of the fluidic element 34 air supplied to the inlet port 33 of the fluidic element 40 will be vented to atmosphere and fuel supplied to the inlet port 53 of the bistable element 52 will be returned to the tank 54.

The aforesaid pulse width fixation circuit ensures that the length of each fuel pulse is constant and thus the quantity of fuel supplied to the induction manifold 31 varies in accordance with the frequency of the acoustic signal produced by the vortex whistle 30 and this is in turn proportional to the rate of flow of air flowing through the induction manifold of the internal combustion engine.

The vortex whistle 30 is shown more particularly in FIGS. 2 and 3 of the accompanying drawings. Air passing into the induction manifold 31 of the engine is introduced into a cylinder 61 through a tangential input 62. The rotating air in the cylinder 61 then passes through a smaller cylinder 63. In its passage from the larger diameter 61 to the smaller diameter cylinder 63, the speed of rotation is increased according to the law of conservation of angular momentum, and an acoustic signal is produced when the rotating air leaves the smaller of cylinder 63, the frequency of the acoustic signal being proportional to the rate of flow of air flowing through the whistle 30.

The operation of such a vortex whistle is more particularly described in the article entitled "A Vortex Whistle" in the Journal of the Acoustical Society of America Volume 26, No. 1, Pages 18 to 20.

It is to be appreciated that the nozzles 58 to 60 described in the above embodiment could be replaced by a mechanical injector. Moreover, the fluidic control device described above could be replaced by an electronic control device and the acoustic signal in this case would be converted to an electrical input signal to the control device by means of a microphone.

It is also to be appreciated that the apparatus described hereinbefore, could be used to vary the pressure of air fed by an air pump to the nozzle 60. In this case, fuel would be supplied to the nozzle 58 by a constant pressure pump, and unless the two nozzles 58 and 60 were directed axially towards each other, the air fed to the nozzle 70 could be used to control the proportion of the fuel fed into the induction manifold, or returned via a passage to the fuel reservoir 54 in accordance with the pressure of the air fed to the nozzle 60. If the nozzles 58 and 60 are axially directed towards each other, then it will be appreciated that by supplying a sufficiently large pressure of air to the nozzle 60 it could be sufficient to prevent any fuel issuing from the nozzle 58.

Referring to FIGS. 4 and 5, a fuel injection system shown in FIG. 4 includes an impact modulator 71 to which fuel is supplied through a line 72 at about 4 p.s.i. to be discharged in finely atomised form upstream of the throttle in the inlet manifold 73 of an engine, and thence induced into the engine cylinders. A flow of pressurised air is fed to the impact modulator through line 74 and directed in opposition to the fuel flow to the engine thereby blocking fuel from being discharged. When required, i.e. when the throttle is opened, air pulses are fed to the impact modulator through line 75 under sufficient pressure to divert the blocking air flow and permit fuel to flow into the inlet manifold for the duration of each pulse. The pulses are caused to occur at a frequency proportional to the air flow in the inlet manifold.

Attached to the inlet manifold is a vortex whistle device 85. The device has a number of tangential inlets (not shown) so that air induced through the device into the manifold creates a vortex in the passage portion 76. Mounted in this passage portion is a rod 77 pivoted at a position 78 along its longitudinal axis so that it can be rotated by the vortex at a rate dependent upon the air flow in the device. The end 78a of the rod is coupled by means of a linkage 79 to a poppet valve (not shown) housed with a valve member 80 to which air is fed under pressure through a line 81 typically at about 10 p.s.i. A suitable valve is manufactured by C. A. Norgen and termed Featherflex Sensor. The air leaves the valve member 80 through a line 82 under the control of the poppet valve, in the form of a series of rounded pressure pulses of frequency dependent upon the rate of rotation of the rod 77 and thus upon the air flow rate in the device 85. A pressure reading taken at point A can be represented by the upper line shown in FIG. 2.

The rounded pulses from the device 80 are fed to a fluid pulse shaping device 86 which can conveniently be an element designated I-Ms1 of the kind manufactured by British Fluidics. Air is also fed through line 87 to the pulse shaper 86 and the resulting output as measured at location B is of the general form shown in the middle line of FIG. 2. The duration $t$ of each rectangular pulse is determined by a delay device D associated with the pulse shaper and is independent of the input frequency. The frequency of the rectangular pulses is, however, equal to that of the input signal. These pulses are then fed to a digital amplifier 83, which is conveniently of the kind designated DA and manufactured by British Fluidics. Air is supplied through a line 84 to the amplifier 83 and the output from the amplifier measured at C is represented by the lower line of FIG. 2. These amplified rectangular pulses are fed via the line 75 to the impact modulator to divert the blocking air flow through line 74 to produce a succession of pulses of finely atomised fuel for supply to the engine.

It will be seen that the number of fuel pulses is directly proportional to the air flow through the inlet manifold which is dependent upon the engine throttle opening and the invention thus provides a simple and convenient fuel injection system using air flow as the main input parameter.

Turning now to the embodiment shown in FIG. 6 an analogue electrical system is used for converting the frequency of the acoustic signal produced by the vortex whistle into a pulse length modulated electrical signal for energising a conventional electromagnet fuel injection valve the winding 91 of which is shown in FIG. 6.

A microphone 92 is positioned in or on the vortex whistle to produce an electrical signal of frequency equal to that of the acoustic signal emitted by the vortex whistle. The microphone 92 is connected to a Schmidt trigger circuit 93 which converts the sinusoidal microphone output into a train of rectangular pulses.

A first monostable circuit 94 is connected to the Schmidt trigger circuit 93 and drives an electronic switch device 95 having a "normally open" characteristic. The Schmidt trigger circuit also drives an electronic switch device 96 having a "normally open" characteristic. A NOR gate 106 with inputs from the monostable circuit 94 and the Schmidt trigger 93 drives a further electronic switch device 97 with a "normally open" characteristic.

The ignition distributor 98 of the engine has associated with it contacts which supply pulses on two lines 98a, 98b at different times in the engine cycle. The line 98a drives a second monostable circuit 99 which operates an electronic switch device 100 with a "normally open" characteristic. The line 98a also drives an electronic switch device 101 with a "normally open" characteristic. The line 98b drives a third monostable circuit 102 which drives an electronic switch device 103 with a "normally open" characteristic. The line 98b also actuates an electronic switch device 104 with a "normally open" contact 104a.

A first operational amplifier $A_1$ has its invert input terminal connected via the switch device 101 and a resistor $R_1$ to a first reference voltage terminal $V_{REF}$. The amplifier $A_1$ is connected as an integrator with a feedback capacitor $C_1$ between its output terminal and the invert input terminal. The capacitor $C_1$ is bridged by the switch device 104 for re-setting purposes as will be hereinafter explained. The non-invert input terminal is grounded.

A second operational amplifier $A_2$ has its non-invert terminal connected by the switch device 100 to the output terminal of the amplifier $A_1$. A capacitor $C_2$ connects the non-invert terminal of the amplifier $A_2$ to ground and the output terminal of this amplifier is connected to the invert input terminal so that the amplifier operates as a non-inverting voltage follower. The output terminal of the amplifier $A_2$ is connected to the following stage by the switch device 103 so that the amplifier $A_2$ is used as a sample-and-hold circuit.

A third operational amplifier $A_3$ is connected as an integrator in exactly the same manner as the amplifier $A_1$, being associated with the switch device 96, a resistor $R_2$ and a second reference voltage terminal $V_{REF}$ and with a capacitor $C_3$ and switch device 97 for re-setting. A fourth operational amplifier forms, in combination with the switch device 95, a capacitor $C_4$ and a further switch device 105, a further sample-and-hold circuit.

The switch devices 103 and 105 connect the output terminals of the amplifiers $A_2$ and $A_4$ via two resistors $R_3$ and $R_4$ to the invert input terminal of a fifth operational amplifier $A_5$. This is connected as an integrator with a feedback capacitor $C_5$ between its output terminal and its invert input terminal. The non-invert terminal is grounded. Finally a sixth operational amplifier $A_6$ is connected as a comparator with its invert input terminal connected to the output terminal of the amplifer $A_5$ and its non-invert input terminal grounded. The output terminal of the amplifier $A_6$ is connected by a resistor $R_5$ to the base of a power transistor $T_1$ which has its emitter grounded and its collector connected via the winding 91 to a power supply terminal V.

The switch device 105 is driven by an OR gate 107 with inputs from the output of the amplifier $A_6$ and from a second output terminal of the monostable circuit 102 at which there is a signal whenever there is no output from the circuit 102 driving the switch device 103.

In operation, the cycle of the circuit may be considered as commencing at an instant when switch device 104 is conductive and switch devices 101 and 103 are non-conductive. Capacitor $C_1$ is then maintained in a discharged condition until, at a predetermined crank angle, the switch device 104 becomes conductive and the switch device 101a becomes non-conductive. The capacitor $C_1$ then charges through the resistor $R_1$. At a later instant, say ½ revolution later, the switch device 101 re-opens and the switch device 100a conducts momentarily for the duration of the pulse produced by the monostable circuit 99. The capacitor $C_2$ is then charged to whatever voltage was present at the output of the amplifier $A_1$ at this later instant. The output of the amplifier $A_2$ is now held at a constant value which is proportional to the period of revolution of the engine.

The amplifiers $A_3$ and $A_4$ operate similarly but in this case the output voltage produced by the amplifier $A_4$ is proportional to the period of the acoustic signal produced by the vortex whistle.

When an injection pulse is required, the monostable circuit 102 is triggered causing the switch device 103 to conduct and thereby causing capacitor $C_5$ to be charged via the resistor $R_3$ for a time determined by the monostable circuit 102, after which switch device 103 ceases to conduct. The output of the comparator $A_6$ switches as soon as the output of the integrator $A_5$ is greater than OV. This initiates opening of the injection valve and also causes switch device 105 to become non-conductive as soon as the monostable circuit 102 re-sets. The capacitor $C_5$ thus discharges through $R_4$ at a rate dependent on the voltage present at the output of amplifier $A_4$.

The time taken for the capacitor to discharge is thus proportional to the ratio of the engine revolution period to the vortex whistle acoustic signal period and the ratio of the resistors $R_3$ and $R_4$ which is a constant. The injector winding 91 is energised for this time, so that control of the fuel injected is obtained.

If desired the reference voltages $V_{REF}$ and $V_{REF}$ may be varied in accordance with other engine parameters, for example to obtain enrichment for starting.

It is to be noted that the output of the amplifier $A_4$ is updated at each cycle of the vortex whistle so that accurate and stable control of fuel can be obtained.

Turning now to FIG. 7 the system shown includes digital electronic circuits for computing the required fuel flow to the engine in accordance with the frequency of the vortex whistle, and in this particular case, four separate injectors 120, 121, 122 and 123 are controlled sequentially. Associated with each injector is a count-down binary circuit 124, 125, 126 and 127. A clock pulse generator 128 supplies clocking pulses to these counter circuits via AND gates 129, 130, 131 and 132 respectively. Four bistable circuits 133, 134, 135 and 136 control these gates and also control the injectors. Each bistable circuit is set by a pulse from a timing device 137 in the engine distributor and is re-set by a pulse from the associated counter when this reaches its zero count state.

A microphone 138 in or on the vortex whistle 139 provides an audio electrical signal of frequency equal to the signal frequency. This signal is fed to an amplifying and pulse squaring circuit 140, the output of which is a squared pulse train of the same frequency. A phase locked loop integrated circuit 141 is used in conjunction with a single dividing circuit 142 (i.e. a counter of say 7 stages) to provide an output at a frequency which is say 128 × the output frequency of the microphone.

The output of the circuit 141 is supplied to a counter 143 which is triggered into operation periodically by the unit 137 via an OR gate 144.

The system operates as follows: at the start of each quarter cycle of the engine, the counter 143 is started with an initial count corresponding to the value of the battery voltage via a setting circuit 145. The count state of the counter 143 is then increased for the duration of the quarter cycle at a rate determined by whistle frequency. At the end of this time the accumulated count will thus be the initial count plus an additional count proportional to the whistle frequency and inversely proportional to the engine speed.

At the commencement of the next quarter cycle the count in the counter 143 is transferred to one of the counters 124 to 127 and this count is then counted out at the clock frequency whilst the associated injector 120 to 123 is energised. Meanwhile the counter 143 is being reprogrammed ready for the next count transfer to a different one of the counters 124 to 127.

Delay circuits 146, 147, 148, 149 and 150 are included to ensure that counting does not start until the count transfer has been completed.

I claim:
1. An engine control system for an internal combustion engine, comprising:
 a vortex whistle means for producing an acoustic signal the frequency of which varies in accordance with the rate of flow of air passing through an induction manifold of an internal combustion engine;
 a control means for controlling the rate of injection of fuel into said induction manifold, in accordance with the frequency of said acoustic signal;
 an electrically actuable fuel injection valve means responsive to said control means for injecting fuel into the manifold;
 said control means comprising a first integrator means for producing a first electrical analogue signal determined by the rate of engine rotation, a second integrator means for producing a second electrical analogue signal determined by the whistle frequency and, a third integrator means having a capacitor connected to be periodically charged to a voltage determined by said first electrical analogue signal and discharged at a rate determined by said second electrical analogue signal to generate a pulse-length modulated output signal to control said injection valve.

2. An engine control system for an internal combustion system, comprising;
   a vortex whistle means having a large cylinder with a tangential air inlet and a small cylinder with an air outlet connected to the inlet of an air induction manifold of an internal combustion engine, for producing an acoustical signal the frequency of which varies in accordance with the rate of mass flow of air passing through said manifold;
   a microphone means proximate to said vortex whistle means for converting said acoustical signal frequency into an electrical signal frequency;
   a first signal integrator means having an input connected to the output of said amplifier for producing a first electrical analog signal whose magnitude is a function of said acoustical signal frequency;
   a second integrator means having an input connected to an output terminal of an ignition distributor on the internal combustion engine, which terminal emits electrical pulses synchronous with the revolutions of the engine, for producing a second electrical analog signal whose magnitude is a function of the rate of engine rotation;
   a third integrator means including a capacitor, having an input connected to the outputs of said first and second integrators, for periodically charging said capacitor to a voltage determined by said second analog signal and discharging said capacitor at a rate determined by said first electrical analog signal;
   a comparator means having a first input connected to the output of said third integrator means and a second input connected to a reference potential, for generating a pulse-length modulated control signal whose duty cycle is proportional to the ratio of said acoustical signal frequency to said rate of engine revolution;
   an electrically actuable fuel injection valve means mounted in the air induction manifold, having an input connected to the output of said comparator means, for injecting an amount of fuel into the manifold during one engine revolution in response to said control signal, which is proportional to the ratio of said acoustical signal frequency to said rate of engine rotation.

3. An engine control system for an internal combustion engine, comprising:
   an acoustic signal generator for producing an acoustic signal the frequency of which varies in accordance with the rate of mass flow of air passing through an induction manifold of an internal combustion engine;
   an acoustical transducing means proximate to said acoustic signal generator, for converting said acoustical frequency to a first analog signal having qualities which are a function of said acoustic signal frequency;
   a speed transducing means connected to a rotating member of the internal combustion engine, for converting the rate of rotation of said engine to a second analog signal having qualities which are a function of said rate of rotation;
   a modulating means having a first input connected to said acoustical transducing means and a second input connected to said speed transducing means, for generating a modulated control signal having qualities which are proportional to the ratio of said acoustic signal frequency to said rate of engine rotation;
   a fuel metering means mounted to introduce fuel into the induction manifold in response to said control signal on a control input connected to the output of said modulating means;
   whereby the fuel introduced into the induction manifold per revolution of the engine, is proportional to the ratio of said acoustic signal frequency to said rate of engine rotation.

* * * * *